(12) United States Patent
Tseng

(10) Patent No.: US 7,337,270 B2
(45) Date of Patent: Feb. 26, 2008

(54) APPARATUS, SYSTEM, AND METHOD FOR SERVICING A DATA STORAGE DEVICE USING WORK-IN-PROCESS (WIP) MAPS

(75) Inventor: Charlie Tseng, San Jose, CA (US)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 322 days.

(21) Appl. No.: 10/938,447

(22) Filed: Sep. 10, 2004

(65) Prior Publication Data

US 2006/0059304 A1    Mar. 16, 2006

(51) Int. Cl.
*G06F 12/00*    (2006.01)
(52) U.S. Cl. ...................................... 711/114
(58) Field of Classification Search ................. 711/114
See application file for complete search history.

(56) References Cited

U.S. PATENT DOCUMENTS 5,412,402 A *    5/1995    Searby et al. ............... 345/639
6,052,302 A *    4/2000    Moyer et al. ................ 365/173
2002/0145902 A1*    10/2002    Kunikiyo et al. ............. 365/97

\* cited by examiner

*Primary Examiner*—Hyung Sough
*Assistant Examiner*—Shawn Eland
(74) *Attorney, Agent, or Firm*—Winston Hsu

(57) ABSTRACT

An apparatus, system, and method are disclosed for servicing a data storage device. A service registration module registers a service process for servicing the stripe groups of a data storage device. A WIP map initialization module creates a WIP map for each stripe group of the service process. The stripe group selection module selects a stripe group and the service module performs the service process on the selected stripe group. The WIP map update module sets the WIP map entry of the selected stripe group. The stripe group selection module uses the WIP map to avoid the repeat selection of a stripe group to receive the service process. An I/O module may determine from the WIP map if a data block of a stripe group may be accessed during the service process and may direct the service process to the data block's stripe group out of turn to increase performance.

38 Claims, 8 Drawing Sheets

800

| 810a<br>1000x | Bit 0<br>820a | Bit 1<br>820b | Bit 2<br>820c | Bit 3<br>820d | Bit 4<br>820e | Bit 5<br>820f | Bit 6<br>820g | Bit 7<br>820h |
|---|---|---|---|---|---|---|---|---|
| 810b<br>1001x | Bit 0<br>840a | Bit 1<br>840b | Bit 2<br>840c | Bit 3<br>840d | Bit 4<br>840e | Bit 5<br>840f | Bit 6<br>840g | Bit 7<br>840h |

FIG. 8

APPARATUS, SYSTEM, AND METHOD FOR SERVICING A DATA STORAGE DEVICE USING WORK-IN-PROCESS (WIP) MAPS

BACKGROUND OF THE INVENTION

1. Field of the Invention

This invention relates to servicing a data storage device and more particularly relates to selective servicing of stripe groups in a redundant array of independent disks ("RAID") system.

2. Description of the Related Art

A data storage system typically stores data to and retrieves data from one or more data storage devices. The data storage devices are typically hard disk drives, optical storage devices, magnetic tape storage devices, or semiconductor-based storage devices such as Flash dynamic random access memory ("DRAM"). One type of the data storage system is a RAID system. The RAID system stores redundant sets of data on one or more data storage devices. The RAID data storage devices are typically hard disks. The RAID hard disks may be organized into a plurality of stripes. Each stripe is a physical area of the hard disk configured to receive and store data. Stripes may be organized into stripe groups to form one or more logical disks from a plurality of hard disks. A first stripe on a first hard disk may be associated with a second stripe on a second hard disk to form the stripe group. A stripe group may allow a logical disk to comprise stripes from a plurality of hard disks. Any number of stripes from any number of hard disks may form the stripe group although a stripe group typically comprises one stripe from each hard disk. A stripe group may include redundant data such as parity data to allow the data from a failed stripe to be recovered.

FIG. 1 is a schematic block diagram illustrating one embodiment of a RAID array 100. The RAID array 100 includes four hard disks, hard disk one (1) 105a, hard disk two (2) 105b, hard disk three (3) 105c, and hard disk four (4) 105d. Each hard disk 105 comprises a plurality of stripes 110, 120, 130, or 140. For example, hard disk one (1) 105a comprises four stripes, stripe zero (0) 110a, stripe three (3) 110b, stripe six (6) 110c, and stripe $P_3$. The stripes on the group of hard disks 105 are organized into stripe groups as illustrated in Table 1.

TABLE 1

| Stripe Group | Stripes | | | |
|---|---|---|---|---|
| | Hard Disk 1 | Hard Disk 2 | Hard Disk 3 | Hard Disk 4 |
| 0 | 0 | 1 | 2 | $P_0$ |
| 1 | 3 | 4 | $P_1$ | 5 |
| 2 | 6 | $P_2$ | 7 | 8 |
| 3 | $P_3$ | 9 | A | B |

The depicted RAID array 100 is a parity RAID array with parity stripes 110d, 120c, 130b, 140a comprising redundant data for each stripe group. The data of a stripe 110, 120, 130, 140, of a stripe group may be recovered using the parity stripes 110d, 120c, 130b, 140a. Stripe group zero (0) comprises stripe zero (0) 110a of hard disk one (1) 105a, stripe one (1) 120a of hard disk two (2) 105b, stripe two (2) 130a of hard disk three (3) 105c, and stripe $P_2$ or parity stripe two 140a of hard disk four (4) 105d. Stripe group one (1) comprises stripe three (3) 110b of hard disk one (1) 105a, stripe four (4) 120b of hard disk two (2) 105b, stripe $P_1$ or parity stripe two 140a of hard disk three (3) 105c, and stripe five (5) 140b of hard disk four (4) 105d. Stripe group two (2) comprises stripe six (6) 110c of hard disk one (1) 105a, stripe $P_2$ or parity stripe two 120c of hard disk two (2) 105b, stripe seven (7) 130c of hard disk three (3) $P_3$ or parity stripe eight (8) 140c of hard disk four (4) 105d. Stripe group three (3) comprises stripe $P_3$ or parity stripe three 110d of hard disk one (1) 105a, stripe nine (9) 120d of hard disk two (2) 105b, stripe A 130d of hard disk three (3) 105c, and stripe B 140d of hard disk four (4) 105d. Each stripe group may form a logical disk in the RAID array 100. In an alternate embodiment, the RAID array 100 may be a mirrored RAID array, with each first stripe of a mirrored or copied to a second stripe. Typically the first stripe and the mirrored second stripe reside on different hard drives 105.

In some prior art arrangments, the RAID array 100 is included in a RAID system (not shown). In addition to storing and retrieving data, the RAID system performs one or more service processes on hard disks 105. Service processes may include initializing a hard disk 105, rebuilding data on a replacement hard disk 105, and checking the consistency of the redundant data on the hard disk 105. The RAID system typically performs the service process on each stripe group.

In one example, the RAID system performs the service process of initializing a hard disk in a parity RAID array 100 by performing an exclusive or ("XOR") operation on all data stripes of each stripe group to generate parity data for the parity stripes 110d, 120c, 130b, 140a of each stripe group. The parity stripe 110d, 120c, 130b, 140a is stored on a hard disk 105. For example, the RAID system may XOR stripe zero (0) 110a, stripe one (1) 120a, stripe two (2) 130a and write the resulting parity data to stripe $P_0$ 140a to initialize stripe group zero (0). The RAID system typically initializes each stripe group. Subsequent to completion, the initialization service process allows any data within the stripe group to be updated along with new parity data on hard disks 105. The new parity data is generated by means of XORing the old data, old parity data and the new data. In one arrangement, the RAID system writes a pattern of binary zeros (0s) to each stripe of a stripe group during the initialization process.

In an alternate arrangement, the service process of initializing a mirrored RAID array consisting of two hard disks 105a, 105b entails copying or mirroring the data of each stripe of each stripe group from the first hard disk 105a to the second hard disk 105b. Thus if the RAID array 100 were a mirrored RAID array, stripe one (1) 120a would mirror stripe zero (0) 110a, stripe four (4) 120b would mirror stripe three (3) 110b, and the like.

The RAID system may also perform the service process of rebuilding a replacement disk that replaces a failed hard disk 105 of a RAID array. Rebuilding consists of regenerating and writing all of the data for each stripe of a failed hard disk to the replacement hard disk at the same relative address. For a parity RAID array 100, data from a failed hard disk 105 for each stripe group is regenerated by computing the XOR of the contents of corresponding stripes on the surviving hard disks 105 including the parity stripe. For example, if hard disk one (1) 105a failed, the RAID system may regenerate stripe zero (0) 10a of stripe group zero (0) from stripe one (1) 120a, stripe two (2), 130a, and parity stripe $P_4$ 140a. For a two-disk mirrored RAID array, replacement data is regenerated from the surviving mirrored hard disk 105. For example, if the RAID array 100 is a mirrored RAID array, the data of hard disk zero (0) 105a is regenerated from hard disk one (1) 105b.

In a certain embodiment, the RAID system also checks the integrity of redundant data for each stripe group. For example, the consistency check service process on a mirrored RAID array makes sure that data on both drives of the mirrored pair is exactly the same. For the RAID array 100 configured as a parity RAID array, a consistency check service process calculates the parity data for each stripe group by XORing all the data from stripes of the stripe group and comparing the resultant parity against the stored parity stripe of the stripe group.

The RAID system typically performs a service process on consecutive stripe groups in a predefined sequence. The stripe groups are typically numbered, and the RAID system services stripe groups in an ascending numerical order. For example, the RAID system may perform the service process on stripe group zero (0) followed by performing the service process on stripe group one (1). A service process can proceed in the predefined sequence while allowing input/output ("I/O") applications to access data on the array at stripe groups that have been serviced. If an I/O application requests access to data in a stripe group that has not completed a service process such as initialization, the RAID system has typically pursued one of two options. One option is to delay the execution of the I/O application until the service process is complete for the associated stripe group. This delay is understandable, as it slows the performance of the data processing system to an unacceptable extent.

The other currently available option is for the RAID system to re-direct the service process to the stripe group containing data requested by the I/O application and delay the data access of the I/O application until the service process is completed for the re-directed stripe group. After the service process is completed for the re-directed stripe group, the service process may continue as if there had not been a re-direction, resuming the service process for the next consecutive stripe group.

For example, if the I/O application receives an I/O command to access a data block in stripe group six (6) and the service process for stripe group six (6) is not complete, the RAID system may re-direct the service process to stripe group six (6) even though the process has only completed stripe group one (1). The I/O application accesses stripe group six (6) containing the requested data block subsequent to the completion of the service process on stripe group six (6). Unfortunately, the RAID system does not track re-directed service processes for stripe groups. As a result, if an I/O application attempts to repeatedly access stripe group 6, the RAID system will repeatedly re-direct the service process to stripe group six (6) until the service process is complete for stripe group six (6) in the services process's normal predefined sequence. Consequently, the RAID system performs the service process on one or more stripe groups multiple times, slowing performance.

From the foregoing discussion, it should be clear that a need exists for an apparatus, system, and method that track the completion of a service process for each stripe group and avoid repeating the service process for a stripe group. In addition, the apparatus, system, and method should allow concurrent access to a stripe group of the RAID array even if the access encounters a delay pending the completion of the re-directed service process. Beneficially, such an apparatus, system, and method would reduce the time a stripe group is inaccessible, thereby improving data storage system performance.

SUMMARY OF THE INVENTION

The present invention has been developed in response to the present state of the art, and in particular, in response to the problems and needs in the art that have not yet been fully solved by currently available data storage systems. Accordingly, the present invention has been developed to provide an apparatus, system, and method for servicing data storage devices that overcome many or all of the above-discussed shortcomings in the art.

The apparatus to service a data storage device is provided with a logic unit containing a plurality of modules configured to functionally execute the necessary steps of servicing a data storage device. These modules in the described embodiment include a work-in-process ("WIP") map, a service registration module, a WIP map initialization module, a stripe group selection module, a service module, and a WIP map update module.

The WIP map initialization module creates the WIP map for a service process configured to service a data storage device. The WIP map is configured with a map entry for each stripe group of the plurality of stripe groups of the data storage device. Each map entry indicates if the service process is complete for the stripe group. The service registration module registers the service process. In one embodiment, the data storage device is configured as a redundant array of independent disks ("RAID") array. The service process may include but is not limited to an initialization process, a rebuild process, and a consistency check process. In one embodiment the service registration module further deregisters the service process if the service process is complete.

The stripe group selection module selects a stripe group. In one embodiment, the stripe group selection module selects the stripe group from the set of WIP map entries indicating that the service process is not complete. The service module performs the service process on the selected stripe group. When the service process is complete for the stripe group, the WIP map update module sets the WIP map entry for the selected stripe group, indicating that the service process is complete.

A system of the present invention is also presented for servicing a data storage device. The system in the disclosed embodiments includes a data storage device, and a data processing device comprising a processor, a memory, a work-in-process WIP map, a service registration module, a WIP map initialization module, a stripe group selection module, a service module, and a WIP map update module. In one embodiment the system comprises an input/output ("I/O") module, a non-volatile memory, an audit log module, and fault-tolerant hard drive storage.

The WIP map initialization module creates a WIP map for a service process and the service registration module registers the service process. The stripe group selection module selects a stripe group and the service module performs the service process on the selected stripe group. The WIP map update module sets the WIP map entry of the selected stripe group.

In one embodiment, the I/O module receives an I/O command to store or retrieve data. The I/O command comprises a data block address indicating a data block of a stripe group where a data block is to be stored to or retrieved from. The I/O module determines if a service process is active. If no service process is active, the I/O module accesses the data block. If a service process is active, the I/O module accesses the data block if the WIP map entry for the data block's stripe group indicates the service process for the data block's stripe group is complete. In addition, if a service process is active, the I/O module delays accessing the data block if the service process for the data block's stripe group is incomplete. In one embodiment, the I/O module re-directs the service process to the data block's stripe group if the WIP map entry for the data block's stripe group indicates the service process is incomplete.

In one embodiment, the audit log module records an audit log. The audit log is stored in the non-volatile memory. The audit log is configured as a log of the stripe group identifiers of set WIP map entries. Each log entry indicates that the WIP map entry for the stripe group has been set. In one embodiment, the audit log module periodically stores a portion of the audit log to a fault-tolerant hard drive storage.

In one embodiment, the audit log module reconstructs the WIP map from the audit log. The audit log module may reconstruct the WIP map after the WIP map is inadvertently lost, such as after a power failure. In one embodiment, the audit log module directs the WIP map initialization module to create a replacement WIP map. The audit log module may further read each entry of the audit log from the non-volatile memory and direct the WIP update module to set the WIP map entry corresponding to the stripe group of each audit log entry, reconstructing the WIP map. In one embodiment, the audit log module reconstructs the WIP map from the portions of the audit log stored in non-volatile memory and the fault-tolerant hard drive storage.

A method of the present invention is also presented for servicing a data storage device. The method in the disclosed embodiments substantially includes the steps necessary to carry out the functions presented above with respect to the operation of the described apparatus and system. In one embodiment, the method includes creating a WIP map, registering a service process, selecting a stripe group, performing the service process on the selected stripe group, and setting the map entry in the WIP map of the selected stripe group.

The WIP map initialization module creates the WIP map for a service process. The service registration module registers the service process. The stripe group selection module selects a group from the set of WIP map entries indicating that the service process is not complete for the corresponding stripe groups. The service module performs the service process on the selected stripe group and the WIP map update module sets the WIP map entry of the selected stripe group. The service module determines if the service process is complete. If the service process is complete, the service registration module may deregister the service process and the method terminates. If the service process is not complete, the stripe group selection module selects a next stripe group and the service module performs the service process on the next selected stripe group.

In one embodiment, the I/O module receives an I/O command comprising a data block address for a data block of a stripe group. The I/O module determines if a service process is active. If a service process is not active, the I/O module executes the I/O command and accesses the data block. If a service process is active, the I/O module accesses the data block if the WIP map entry for the data block's stripe group indicates the service process for the data block's stripe group is complete. If the service process is active and the WIP map entry for the data block's stripe group indicates the service process is not complete for the data block's stripe group, the I/O module delays accessing the data block. In one embodiment, the I/O module re-directs the service process to the data block's stripe group.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention employs a WIP map to track the completion of a service process on each stripe group of a data storage device. In addition, the present invention prevents the repeated performance of the service process on a stripe group. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8 is a schematic block diagram illustrating one embodiment of a WIP map bit map of the present invention.

DETAILED DESCRIPTION OF THE INVENTION

Figure 1:
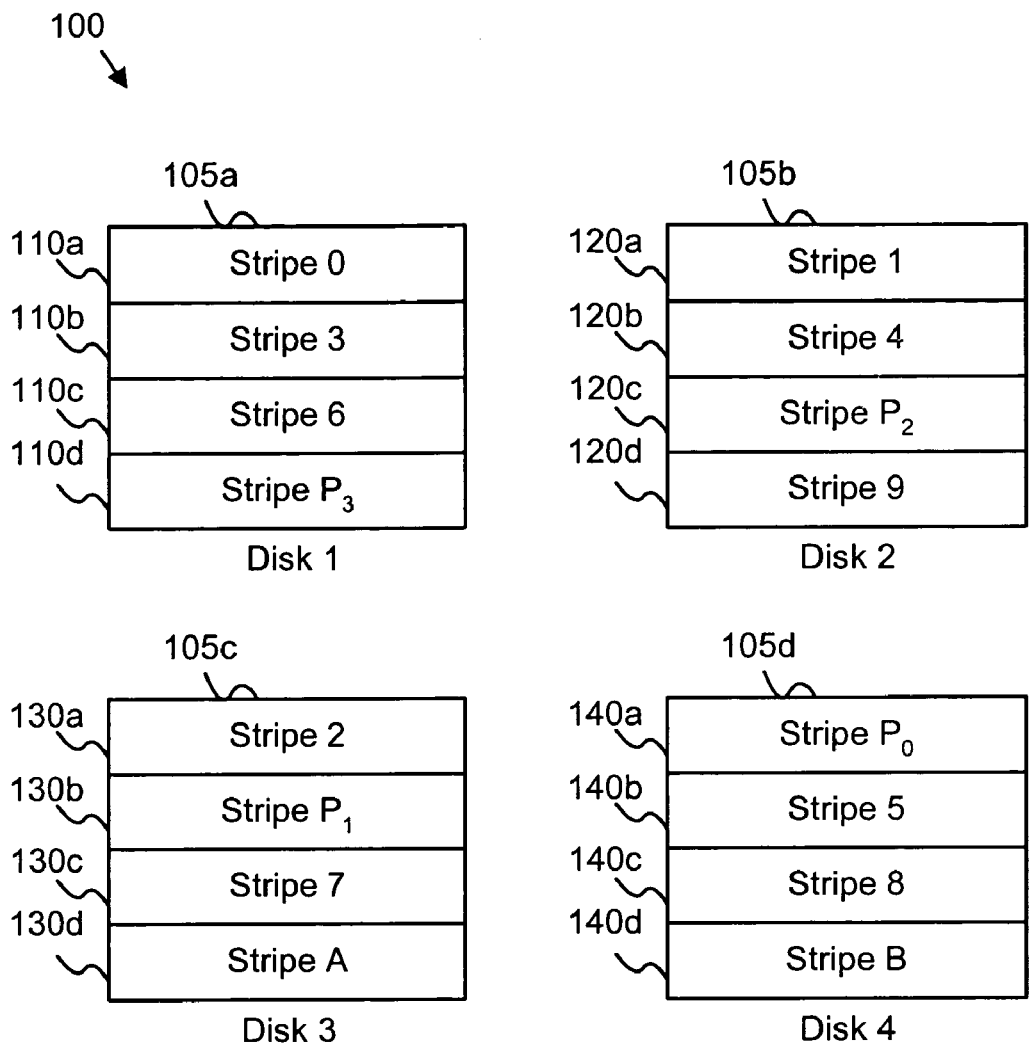
FIG. 1 is a schematic block diagram illustrating one embodiment of a RAID array of the prior art.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code stripe groups, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
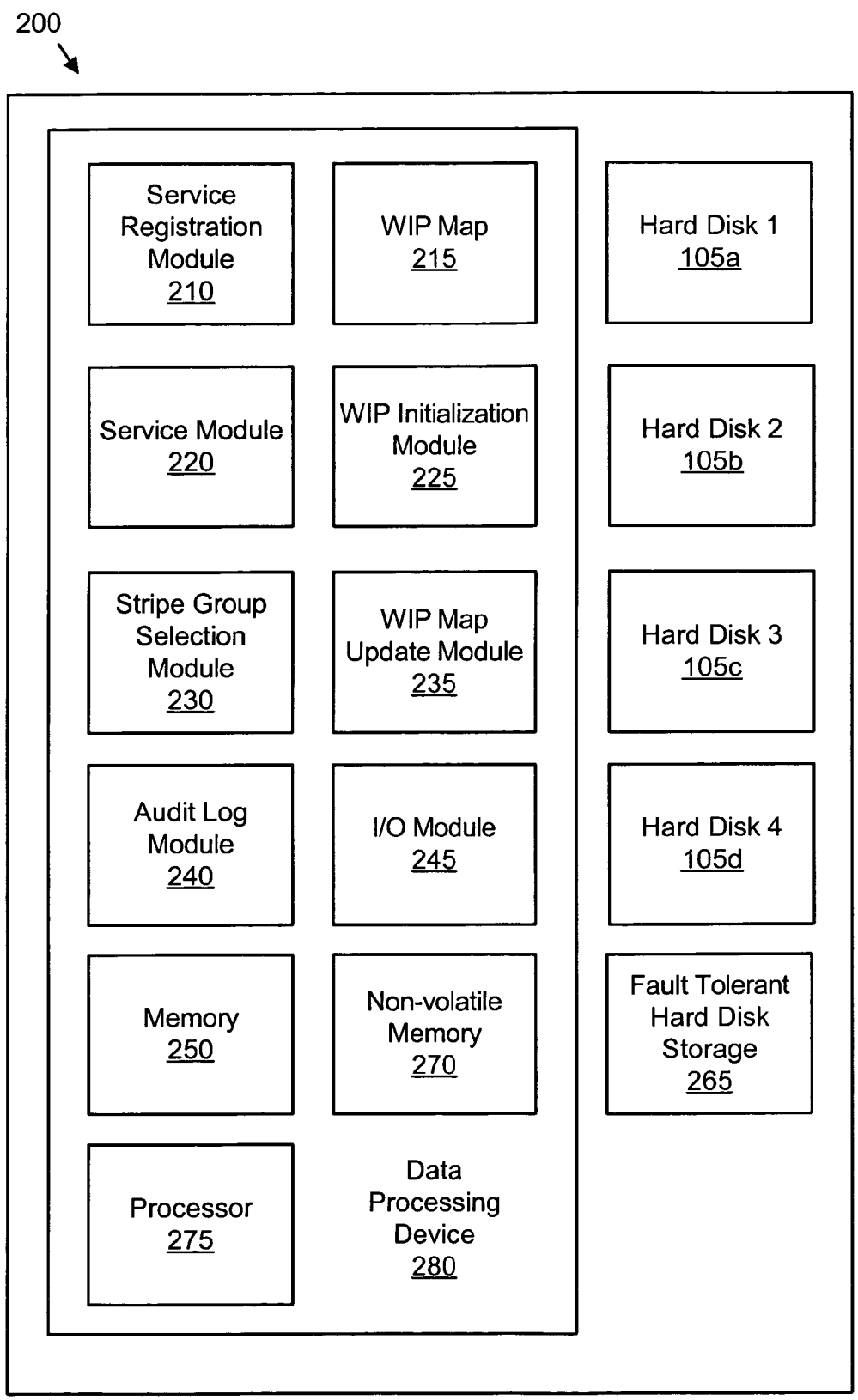
FIG. 2 is a schematic block diagram illustrating one embodiment of a service system in accordance with the present invention.

FIG. 2 depicts a schematic block diagram illustrating one embodiment of a service system 200 in accordance with the present invention. The service system 200 services one or more hard disks 105. In one embodiment, hard disks 105 form a redundant array of independent disks ("RAID") array. The service system 200 further comprises a data processing device 280. The data processing device 280 may be a server, a host computer, or an embedded controller of a hard disk 105. In the depicted embodiment, the data processing device 280 includes a processor 275 and a memory 250 each of which are well known to those skilled in the art.

In addition, the data processing device 280 comprises a service registration module 210, a WIP map 215, a service module 220, a WIP initialization module 225, a stripe group selection module 230, a WIP map update module 235, an audit log module 240, an input/output ("I/O") module 245, and a non-volatile memory 270. The service system 200 may also include fault-tolerant hard drive storage 265. The fault-tolerant hard drive storage 265 preserves stored data even if a portion of the data is lost. Although the service system 200 is depicted with four hard disks 105, any number of hard disks 105 may be employed.

In the depicted embodiment, each hard disk 105 comprises a plurality of stripes. Stripes from one or more hard disks 105 are organized as stripe groups. The WIP map initialization module 225 creates a WIP map 215 for a service process such as an initialization service process, a rebuild service process, a consistency check service process and the like. The WIP map 215 is configured with a WIP map entry for each stripe group. In one embodiment, stripe groups are organized as collections of stripe groups and the WIP map 215 is configured with a WIP map entry for each collection of stripe groups. In an alternate embodiment, the WIP map 215 is configured with a WIP map entry for each stripe. The WIP map 215 tracks the completion of the service process for each stripe group. In one embodiment the WIP map 215 is a bit map. The service registration module 210 registers the service process, indicating that the service process is active. In one embodiment, the service registration module 210 registers a function call for the service process.

The stripe group selection module 230 selects one or more stripe groups and the service module 220 performs the service process on the selected stripe group. The WIP map update module 235 sets the WIP map entry of the selected stripe group subsequent to the completion of the service process on the stripe group. For example, the service registration module 110 may register an initialize service process. The initialization service process may be a software process residing in the memory 250 and executing on the processor 275. The WIP map initialization module 225 creates a WIP map 215 residing in the non-volatile memory 270 for the initialization service process. The WIP map 215 may be a bit map with each bit of the WIP map 215 bit map comprising a WIP map entry bit representing a stripe group. Each bit of the WIP map 215 is reset to zero (0), indicating that each stripe has not been initialized.

The stripe group selection module 230 selects a stripe groups and the service module 220 performs an exclusive or ("XOR") operation on the selected stripe group. The service module 220 further stores the result as a parity stripe, completing the initialization service process for the selected stripe group. The WIP map update module 235 sets the selected stripe group's WIP map entry bit to one (1) indicating that the service process is complete.

In one embodiment, the I/O module 245 receives an I/O command to store and receive data. The I/O command includes address information indicating one or more data blocks physically stored in a stripe of a stripe group. The I/O module 245 determines if a service process is active for the stripe group of the data block indicated by the I/O command. If no service process is active, the I/O module 245 accesses the data block.

If a service process is active, the I/O module 245 accesses the data block if the WIP map entry for the data block's stripe group indicates the service process for the data block's stripe group is complete. In addition, if a service process is active, and if the data block's stripe group WIP map entry indicates the service process for the data block's stripe group is incomplete, the I/O module 245 delays accessing the data block until the service process is complete for the data block's stripe group. In one embodiment, the I/O module 245 directs the stripe group selection module 230 to select the data block's stripe group so that the service module 220 performs the service process on the data block's stripe group. The WIP map update module 235 sets the data block's stripe group's WIP map entry bit indicating that the service process is complete, and the I/O module 245 accesses the data block. The out-of-order performance of the service process may speed performance.

In one embodiment, the audit log module 240 records an audit log. The audit con log is configured as a log of the stripe group identifiers for each stripe group with a set WIP map entry. Each log entry forms an audit trail indicating that the WIP map entry has been set for the indicated stripe group. For example, if the WIP map update module 235 sets the WIP map entry for a stripe group zero (0) 110*a*, the audit log module 240 records an identifier of stripe group zero (0) 110*a*.

In one embodiment, the fault-tolerant hard drive storage 265 stores a portion of the audit log. The audit log module 240 may periodically copy portions of the audit log from the non-volatile memory 270 to the fault-tolerant hard drive storage 265 and free the data storage space used by the audit log in the non-volatile memory 270. The audit log may reside in the non-volatile memory 270 or the fault-tolerant hard drive storage 265. In addition, portions of the audit log may reside in both the non-volatile memory 270 and the fault-tolerant hard drive storage 265.

In one embodiment, the audit log module 240 recovers the WIP map 215 from the audit log. The audit log module 240 may reconstruct the WIP map 215 after the WIP map 215 is inadvertently lost, such as after a power failure. In one embodiment, the audit log module 240 directs the WIP map initialization module 225 to create a replacement WIP map 215. The audit log module 240 may further read each entry of the audit log and direct the WIP update module 235 to set the WIP map entry corresponding to the stripe group identified by each audit log entry, reconstructing the WIP map 215. The service system 200 services the hard disks 105, tracking the completion of the service process for each stripe group of the hard disks 105.

Figure 3:
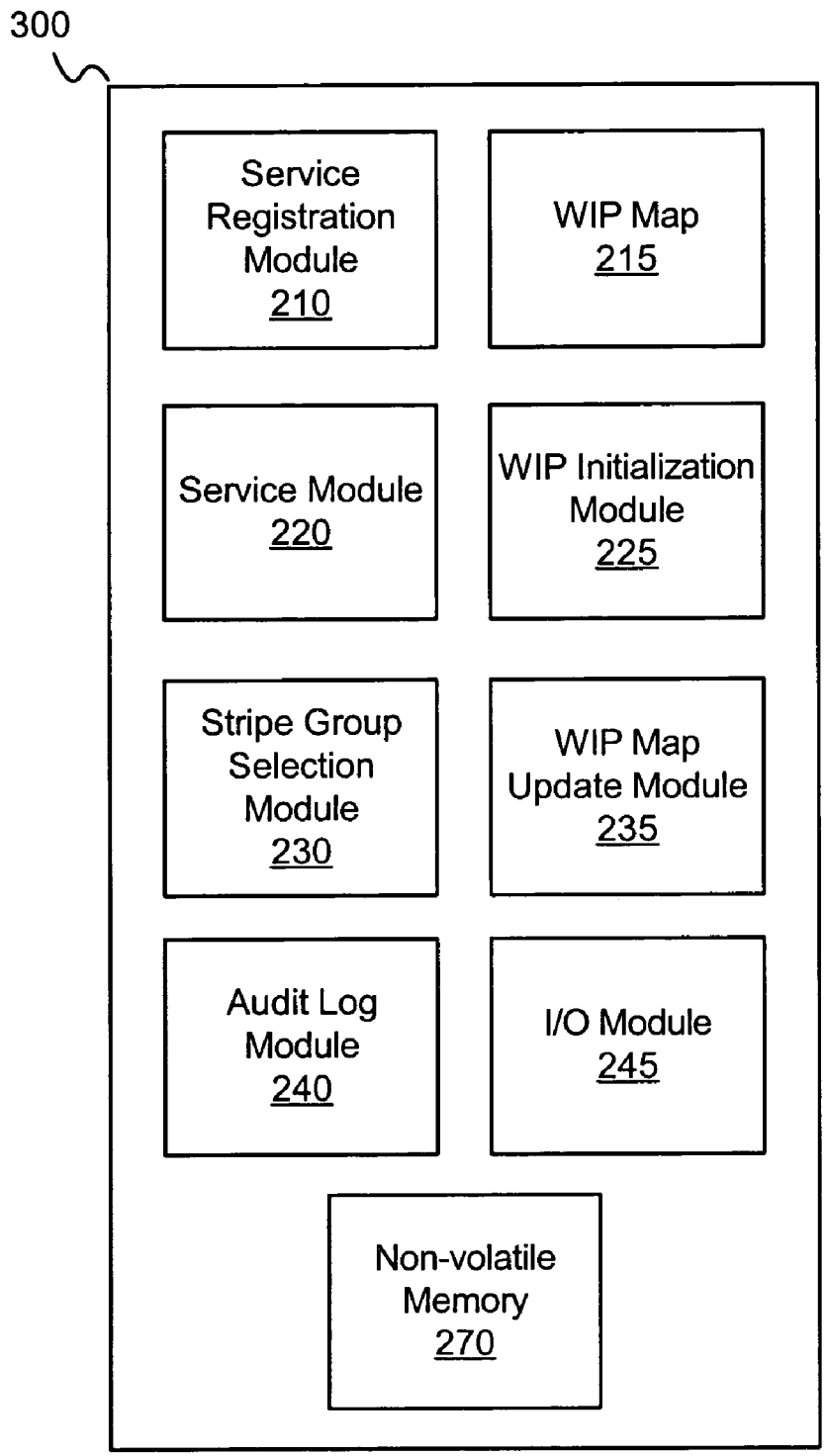
FIG. 3. is a schematic block diagram illustrating one embodiment of a service apparatus of the present invention.

FIG. 3. is a schematic block diagram illustrating one embodiment of a service apparatus 300 of the present invention. The service apparatus 300 tracks the completion of a service process configured to service one or more hard disks 105 and allows stripe groups to be serviced out of order without the service process being repeated for one or more stripe groups. The WIP map initialization module 225 creates the WIP map 215 for the service process. The WIP map 215 is configured with a map entry for each stripe group of the plurality of stripe groups residing on one or more hard disks 105. Each map entry indicates whether the service process is complete for the stripe group. In one embodiment, each initial WIP map entry indicates that the service process is not complete.

The service registration module registers 210 the service process. In one embodiment, the service registration module 210 also registers a function call to the service process. The function call may be executed by the service module 220 to perform the service process on a stripe group, a collection of stripe groups, or on a stripe of a stripe group.

The stripe group selection module 230 selects a stripe group. In one embodiment, the stripe group selection module 230 selects the stripe group from the set of WIP map entries indicating that the service process for the stripe groups is not complete. In addition, the stripe group selection module 230 may follow a selection convention for selecting at least one stripe group from among a plurality of stripe groups with incomplete service processes. In one embodiment, the stripe group selection module 230 uses the selection convention of selecting stripe groups in ascending numerical order.

For example, if the WIP map entries indicate that the service process is incomplete for stripe group three (3) and stripe group four (4), the stripe group selection module 230 may select stripe group three (3) as the stripe group where the service process is incomplete and as the next stripe group in ascending numerical order. The service module 220 performs the service process on the selected stripe group. In one embodiment, the service module 220 executes the function call of the service process to perform the service process. The WIP map update module 235 sets the WIP map entry of the selected stripe group, indicating that the service process is complete.

For example, service registration module 210 may register an initialization service process. The initialization service process may be configured to initialize each stripe group of the data processing device by performing an XOR operation on the data of each stripe group and storing the result as a parity stripe. The service registration module 210 may register a function call to the initialization service process. For example, the function call may perform the initialization service process on a specified stripe group. The WIP map initialization module 225 creates a WIP map 215 for the initialization service process. The WIP map 215 contains a WIP map entry for each stripe group that will be initialized.

Further by way of example, the WIP map initialization module 225 may create a WIP map 215 with entries for stripe group zero (0), stripe group (1), stripe group two (2) and stripe group three (3) of Table 1. Each WIP map entry initially indicates that the initialization service process has not been performed. The stripe group selection module 230 selects a stripe group and the service module 220 performs the initialization service process on the selected stripe group. For example, the stripe group selection module 230 may select stripe group three (3). The service module 220 performs the initialization service process on stripe group three (3). In one embodiment, the service module 220 executes the function call with stripe group three (3) as the specified stripe group, such as by passing the identifier for stripe group three (3) to the function. The function may perform the initialization service process on stripe group three (3), XORing stripe nine (9) 120*d*, stripe A 130*d*, and stripe B 140*b* and storing the result $P_3$ on hard disk one (1) 105*a*. The WIP map update module 235 sets the WIP map entry of stripe group three (3) to indicate that the stripe group three (3) has been initialized.

In one embodiment, the service registration module 210 deregisters the service process if the service process is complete. In the example above, the service registration module 210 may deregister the initialization service process if each WIP map entry of the initialization service process WIP map 215 is set. The service registration module 210 may further deregister the function call of the initialization service process. The service apparatus 300 allows the service module 220 to selectively perform the service process on one or more stripe groups without duplication.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
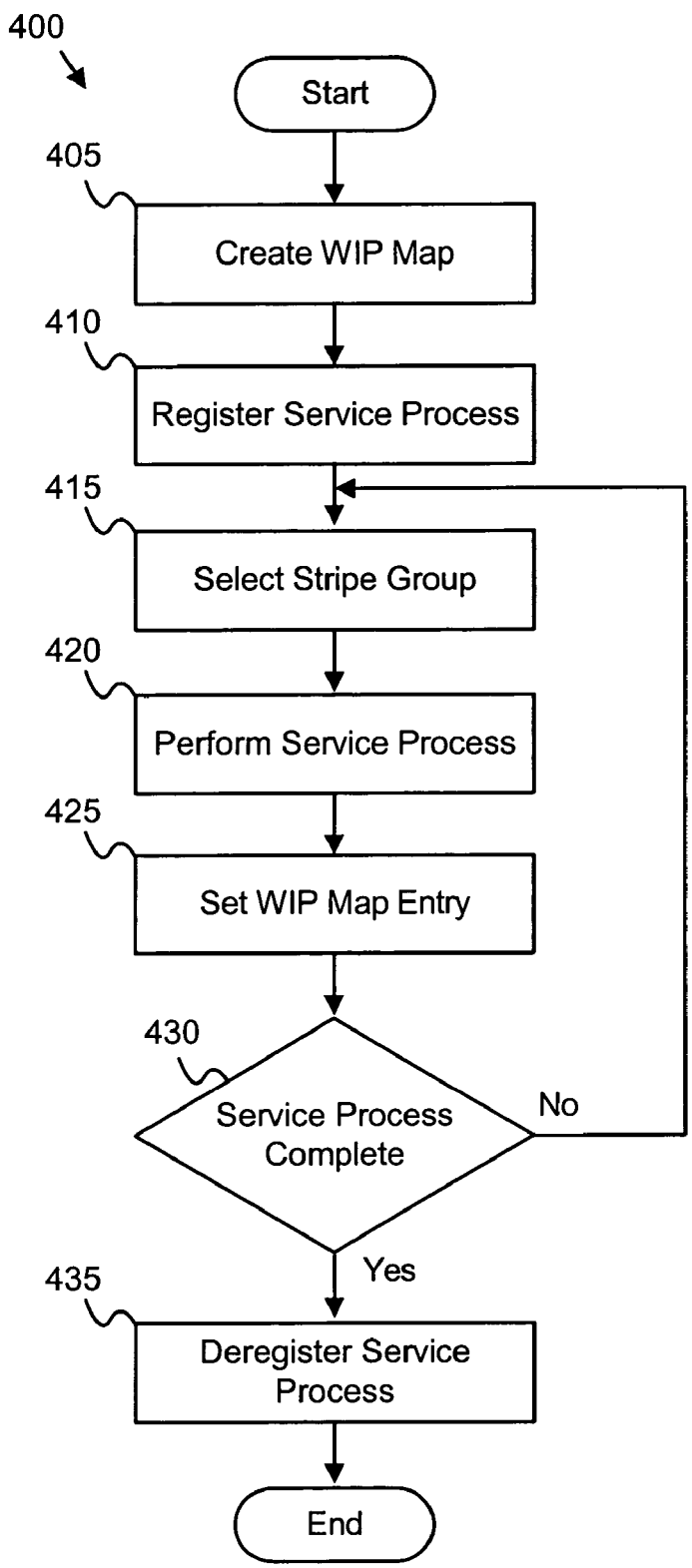
FIG. 4 is a schematic flow chart diagram illustrating one embodiment of a service method in accordance with the present invention.

FIG. 4 is a schematic flow chart diagram illustrating one embodiment of a service method 400 in accordance with the present invention. The WIP map initialization module 225 creates 405 a WIP map 215 for the service process. The WIP map 215 may include WIP map entries for one or more service processes. In one embodiment, the WIP map 215 is a bit map with a single bit entry for each service process of stripe group. In an alternate embodiment, the WIP map 215 is a linked array of WIP map entries. Each WIP map entry may include a stripe group identifier and a status word indicating if the service process is complete. In one embodiment, the WIP map initialization module 225 writes a pointer to the WIP map 215 to the service process array.

The service registration module 210 registers 410 the service process. In one embodiment, the service registration module 210 maintains a service process array such as a linked array of service process information. Each service process array entry may comprise a service process function call and a pointer to WIP map 215.

The stripe group selection module 230 selects 415 a group from the set of WIP map entries that indicate that the service process is not complete for the corresponding stripe groups. For example, if the WIP map 215 is a bit map and the stripe group selection module 230 queries the bit representing stripe group sixteen (16), the stripe group selection module 230 may select stripe group sixteen (16) if the queried bit has a binary value of zero (0) indicating that the service process is incomplete.

The service module 220 performs 420 the service process on the selected stripe group. In one embodiment, the service module 220 passes the stripe group identifier to the function call of the service process as an argument and executes the function. The service module 220 may also pass an identifier for a collection of stripe groups to the function call. In an alternate embodiment, the service module 220 identifies each stripe of the selected stripe group and passes a stripe identifier for each stripe one stripe at a time to the function call, executing the function for each stripe.

The WIP map update module 235 sets 425 the WIP map entry of the selected stripe group in response to the completion of the service process for the stripe group. For example, the WIP map update module 235 may write a status word to the stripe group's WIP map entry in the array of linked WIP map entries. Alternatively, the WIP map update module 235 may write a binary one (1) to the stripe group's WIP map entry bit.

The service module 220 determines 430 if the service process is complete for each stripe group. In one embodiment, the service module 220 determines 430 that the service process is complete by verifying that each WIP map entry indicates the service process is complete. If the service process is complete, the service registration module 210 may deregister 435 the service process and the method terminates. If the service process is not complete, the stripe group selection module 230 selects 415 a next stripe group such as the next consecutively numbered stripe group and the service module 220 performs 420 the service process on the next selected stripe group. The service method 400 tracks the completion of the service process using the WIP map 215.

Figure 5:
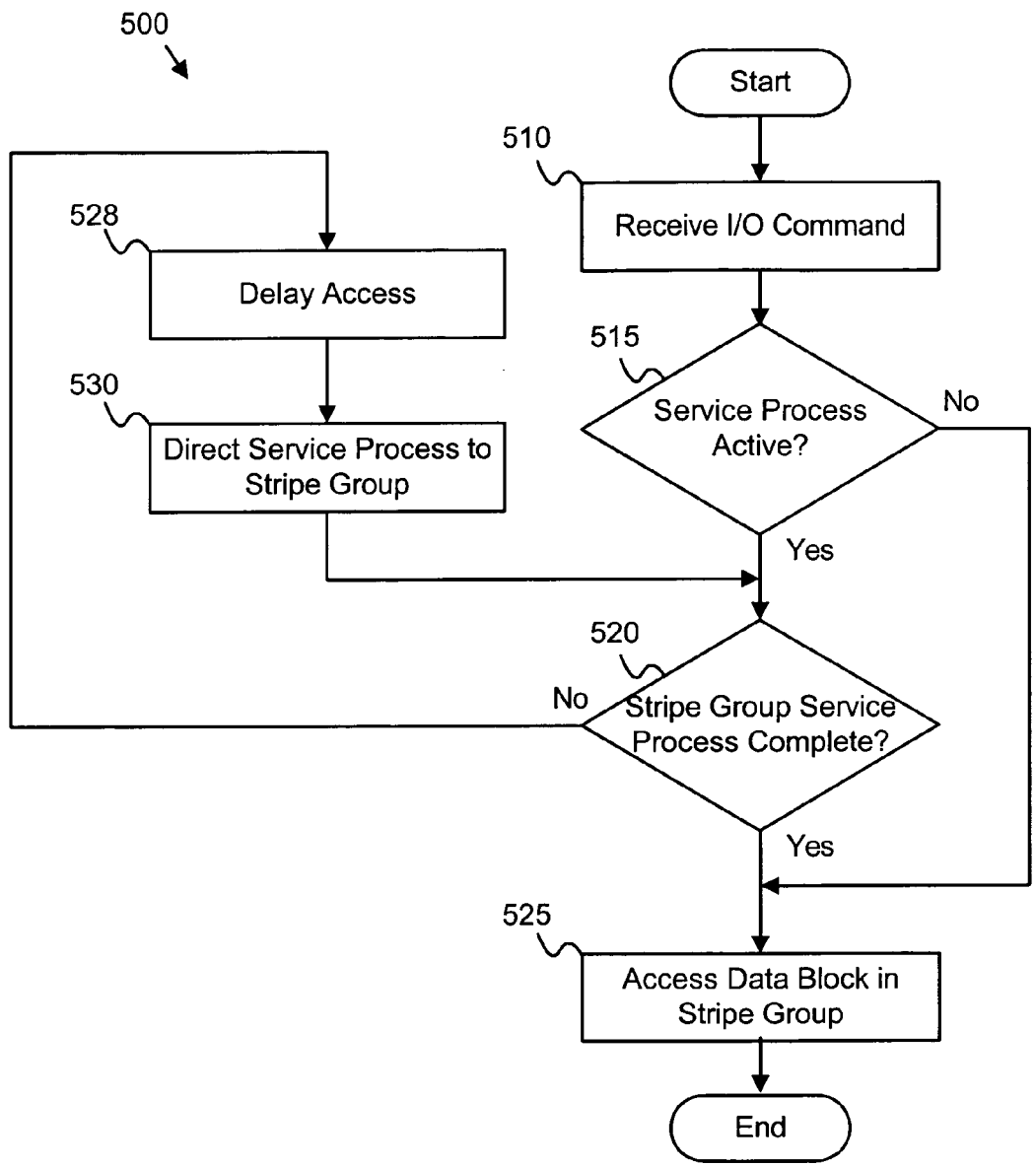
FIG. 5 is a schematic flow chart diagram illustrating one embodiment of a data access method in accordance with the present invention.

FIG. 5 is a schematic flow chart diagram illustrating one embodiment of a data access method 500 in accordance with the present invention. The I/O module 245 receives 510 an I/O command comprising the address of a data block in a stripe group. In one embodiment, the I/O module 245 receives 510 the I/O command from a host system such as a mainframe computer. The I/O module 245 determines 515 if a service process is active. In one embodiment, the I/O module 245 queries the service process array to determine 515 if a service process is active. If no service process is active, the I/O module 245 accesses 525 the addressed data block.

If a service process is active, the I/O module 245 determines 520 if the service process for the stripe group of the data block is complete. In one embodiment, the I/O module 245 queries the WIP map entry for the stripe group of the data block to determine 520 whether the service process for the data block's stripe group is complete. The I/O module 245 accesses 525 the stripe group if WIP map entry indicates the service process is complete for the data block's stripe group. If the service process is active and the I/O module 245 determines 520 the service process is not complete for the data block's stripe group, the I/O module 245 delays 528 accessing the data block.

In one embodiment, if the I/O module 245 delays 528 accessing the data block, the I/O module 245 directs 530 the service process to the data block's stripe group. The I/O module 245 may direct 530 the service process to the data block's stripe group by directing the stripe group selection module 240 to select 415 the data block's stripe group. The service module 220 performs 420 the service process on the data block's stripe group in response to the selection 415 of the data block's stripe group and the WIP map update module 235 sets 425 the WIP map entry of the data block's stripe group as described in FIG. 4. The I/O module 245 again determines 520 if the service process for the data block's stripe group is complete. The method 500 allows the out-of-order performance of a service process on a stripe group without the subsequent repeat performance of the service process on the stripe groups as the WIP map 215 preserves a record of completion of the service process for each stripe group.

Figure 6:
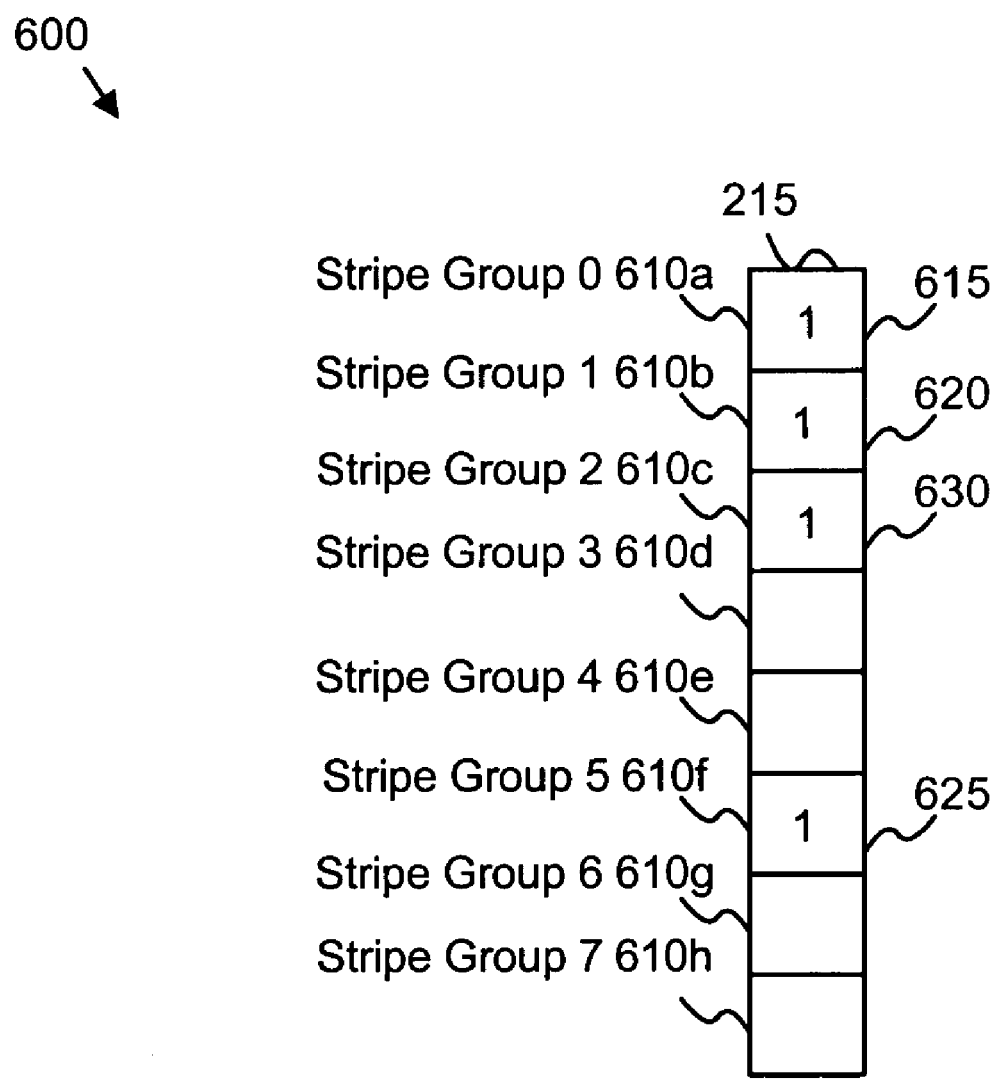
FIG. 6 is a schematic block diagram illustrating one embodiment of a WIP con map of the present invention.

FIG. 6 is a schematic block diagram illustrating one embodiment of a WIP map 600 of the present invention. The WIP map 600 illustrates in greater detail one example of a manner of implementation of the WIP map 215 described in FIGS. 2 and 3. In the depicted embodiment, the WIP map 600 includes a plurality of WIP map entries 610. Each WIP map entry 610 may be a bit of a bit map. Each bit may be associated with a stripe group by the bit's position in the bit map. For example, a first WIP map entry 610a bit may be associated with stripe group zero (0) and a second WIP map entry 610b bit may be associated with stripe group one (1). In an alternate embodiment, the WIP map 215 is a linked array of WIP map entries. The WIP map 600 is associated with a service process.

In the depicted embodiment, the service module 220 performs 420 the service process on stripe group zero (0) and the WIP map update module 235 sets 425 the stripe group 0 WIP map entry 610a bit 615. In addition, the service module 220 may perform 420 the service process on stripe group one (1) and the WIP map update module 235 may set 425 the stripe group one (1) WIP map entry 610b bit 620. WIP map entries 610 may be set in any order. For example, the stripe group five (5) WIP map entry 610f bit 625 may be set before the stripe group two (2) WIP map entry 610c bit 630. The WIP map 600 allows service process completion to be tracked to avoid repeating the service process for a stripe group.

Figure 7A:
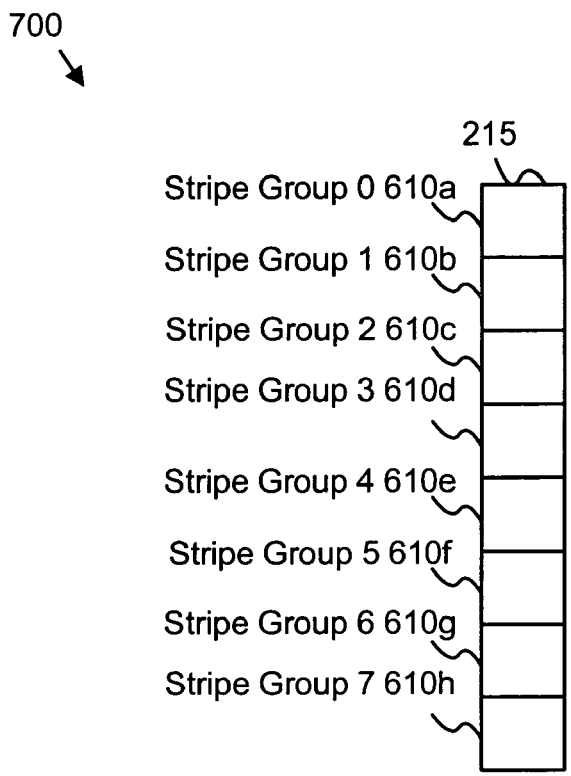
FIGS. 7*a* and 7*b* are schematic block diagrams illustrating one embodiment of a WIP map recovery of the present invention.
Figure 7B:
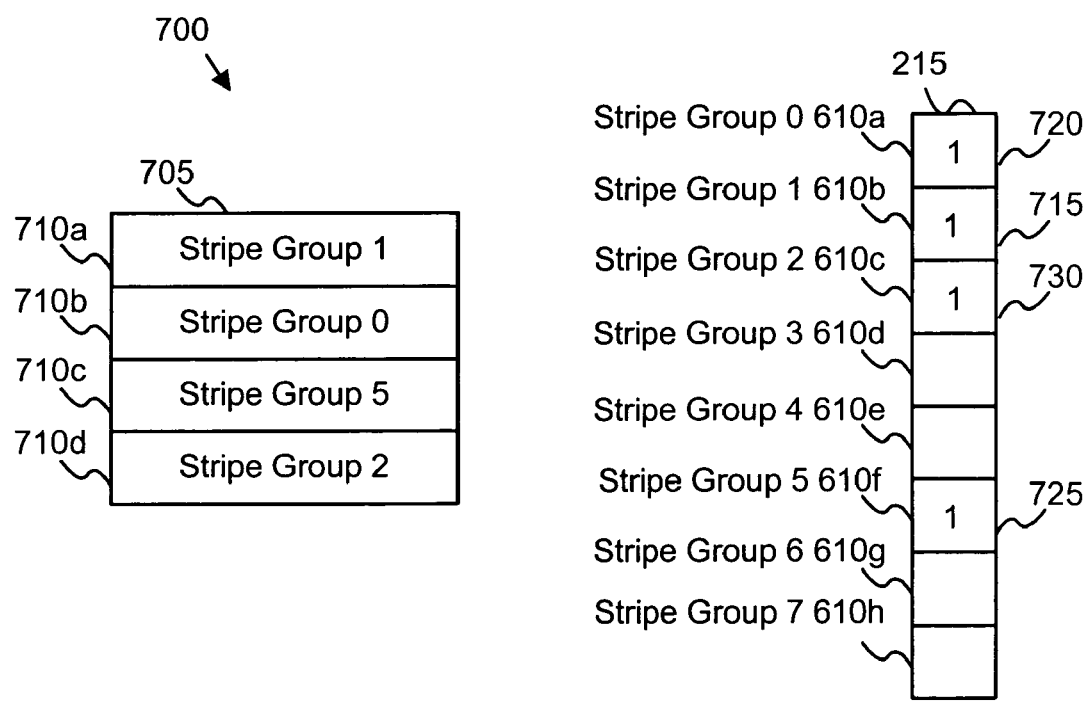

FIGS. 7a and 7b are schematic block diagrams illustrating one embodiment of a WIP map recovery 700 of the present invention. As depicted in FIG. 7a, the WIP map entries 610 of a WIP map 215 have been reset and show no record of the completion of a service process for any of the stripe groups. The WIP map 215 may have been recreated after a power failure, for example. In the depicted embodiment, the service process has been completed for some stripe groups 610 and although the WIP map 215 shows no completions, the audit trail for the each service process completion is recorded in an audit log 705 as depicted in FIG. 7b.

The audit log 705 comprises a plurality of stripe group identifiers 710. The audit log 705 may be configured as a list of stripe group identifiers 710 in a file. For example, each time the WIP map update module 235 sets 425 a WIP map entry 610 for a stripe group, the audit log module 240 may write the stripe group identifier 710 of the stripe group to a file comprising the audit log 705. In an alternate embodiment, the audit log 705 is a log array comprising a log entry for each WIP map entry 610 of the WIP map 215. Each time a WIP map entry 610 for a stripe group is set, the audit log module 240 may add the audit trail of the event to the log entry for the stripe group in the log array to indicate that the map entry 610 was set. For example, the audit log module 240 may write a status word indicating service process completion to the log array entry for a stripe group. In one embodiment, the audit log module 240 copies a portion of the audit log 705 to the fault-tolerant hard drive storage 265.

The audit log module 240 may recover the WIP map 215 if the service process is interrupted due to power failure or the like. The audit log module 240 directs the WIP initialization module 225 to recreate 405 a WIP map 215. In addition, the audit log module 240 reads a stripe group identifier 710 from the audit log 705 and directs the WIP map update module 235 to set the WIP map entry 610 for the stripe group indicated by the stripe group identifier 710. The audit log module 240 further directs the WIP map update module 235 to set the WIP map entry 610 for each stripe group identifier 710 of the audit log 705.

For example, the audit log module 240 may recover the WIP map 215 from the audit log 705 by reading the stripe group one (1) identifier 710a from the audit log 705 and directing the WIP map update module 235 to set 715 the stripe group one (1) WIP map entry 610b. The audit log module 240 further reads the stripe group zero (0) identifier 710b from the audit log 705 and directs the WIP map update module 235 to set 720 the stripe group zero (0) WIP map entry 610a. The audit log module 240 may continue reading stripe group identifiers 710 and directing the setting of WIP map entries 610, setting 725, 730 the stripe group five (5) WIP map entry 610f and the stripe group two (2) WIP map entry 610c until the WIP map 215 is reconstructed from the audit log 705.

In one embodiment, the audit log 705 is stored in a non-volatile memory 270. In an alternate embodiment, the audit log 705 is stored on the fault-tolerant hard drive storage 265. In a certain embodiment, a portion of the audit log 705 is stored in the non-volatile memory 270 and a portion of the audit log 705 is stored on the fault-tolerant hard drive storage 265. The audit log module 240 may also reconstruct the WIP map 215 from the audit log 705 stored on the non-volatile memory 265, the fault-tolerant hard drive storage 265, and both the non-volatile memory 265 and the fault-tolerant hard drive storage 265. The audit log 705 allows the WIP map 215 to be recovered if the WIP map is lost 215.

FIG. 8 is a schematic block diagram illustrating one embodiment of a WIP map bit map 800 of the present invention. The map 800 begins at a first memory location 810a. The first memory location 810a is depicted with the hexadecimal address of 1000x although the first memory location 810a may be located at any address. In the depicted embodiment, each memory location 810 comprises eight (8) bits 820 840, although a memory location 810 may have any number of bits 820, 840.

Stripe group zero (0) may be represented by bit zero (0) 820a of the first memory location 810a. In addition, stripe group seven (7) may be represented by bit seven (7) 820h of the first memory location 810a. Subsequent stripe groups may be represented by bits 820, 840 of additional memory locations 810. For example, as depicted the WIP map 800 may include a second memory location 820b. The depicted second memory location 810b has a hexadecimal address of 1001x and is sequential to the first memory location 810a, although the second memory location 810b may be located at any address. Stripe group eight (8) may be represented by bit zero (0) 840a of the second memory location 810b. Although the WIP map bit map 800 is depicted with a total of sixteen (16) bits, any number of bits may be employed.

In one embodiment, a bit value of binary zero (0) indicates that the service process is not complete for the associated stripe group and a bit value of binary one (1) indicates that the service process is complete for the associated stripe group. In an alternate embodiment, a bit value of binary one (1) indicates that the service process is not complete for the associated stripe group and a bit value of binary zero (0) indicates that the service process is complete for the associated stripe group.

The present invention is the first to track the out-of-order performance of a service process on stripe groups, employing a WIP map 215 to track the completion of the service process on each stripe group of a plurality of stripe groups. In addition, the present invention prevents a data storage system such as a RAID system from repeating the performance of the service process on a stripe group. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to service a data storage device, the apparatus comprising:

a service registration circuit configured to register a service process configured to service a data storage device configured with a plurality of stripe groups;

a work-in-process ("WIP") map configured with a plurality of WIP map entries corresponding to each stripe group and configured to track the service process completion status of each stripe group;

a WIP map initialization circuit configured to create the WIP map;

a stripe group selection circuit configured to select a stripe group based on the WIP map;

a service circuit configured to perform the service process on the selected stripe group; and a WIP map update circuit configured to set the WIP map entry for the selected stripe group.

2. The apparatus of claim 1, further comprising an input/output ("I/O") circuit configured to execute an I/O command comprising a data block address of a data block of a stripe group, access the data block if no service process is active, access the data block if a service process is active and the WIP map entry for the data block's stripe group indicates the service process for the data block's stripe group is complete, and delay access to the data block until the service process is complete for the data block's stripe group if the service process is active and the WIP map entry for the data block's stripe group indicates the service process for the data block's stripe group is incomplete.

3. The apparatus of claim 2, wherein the I/O circuit is further configured to direct the stripe group selection circuit to select the data block's stripe group, wherein responsive to the stripe group selection circuit's selection, the service circuit performs the service process on the data block's stripe group, the WIP map update circuit sets the WIP map entry for the data block's stripe group, and the I/O circuit accesses the data block.

4. The apparatus of claim 1, wherein the service registration circuit is further configured to deregister the service process if the service process is complete.

5. The apparatus of claim 1, wherein the data storage device is configured as a redundant array of independent disks ("RAID") hard disk array.

6. The apparatus of claim 5, wherein the service process is configured to initialize the selected stripe group.

7. The apparatus of claim 5, wherein the service process is configured to rebuild a replacement stripe within the selected stripe group.

8. The apparatus of claim 5, wherein the service process is configured to check the data consistency of the selected stripe group.

9. The apparatus of claim 1, further comprising an audit log circuit configured to record an audit log configured as a log of the stripe group identifiers of set WIP map entries.

10. The apparatus of claim 9, wherein the audit log circuit is configured to reconstruct the WIP map from the audit log.

11. The apparatus of claim 10, further comprising a non-volatile memory configured to store the audit log.

12. The apparatus of claim 11, further comprising fault-tolerant hard drive storage configured to receive and store a portion of the audit log from the non-volatile memory.

13. The apparatus of claim 12, wherein the audit log circuit is configured to reconstruct the WIP map from the audit log stored on the non-volatile memory and the fault-tolerant hard drive storage.

14. A system to service a data storage device, the system comprising:
a data storage device configured with a plurality of stripe groups; and
a data processing device comprising:
a processor;
a memory;
a service registration module configured to register a service process configured to service the data storage device;
a WIP map configured with a plurality of WIP map entries corresponding to each stripe group and configured to track the service process completion status of each stripe group;
a WIP map initialization module configured to create the WIP map;
a stripe group selection module configured to select a stripe group responsive to the WIP map;
a service module configured to perform the service process on the selected stripe group; and
a WIP map update module configured to set the WIP map entry for the selected stripe group.

15. The system of claim 14, wherein the data processing device further comprises an I/O module configured to execute an I/O command comprising a data block address of a data block of a stripe group, access the data block if no service process is active, access the data block if a service process is active and the WIP map entry for the data block's stripe group indicates the service process for the data block's stripe group is complete, and delay access to the data block until the service process is complete for the data block's stripe group if the service process is active and the WIP map entry for the data block's stripe group indicates the service process for the data block's stripe group is incomplete.

16. The system of claim 15, wherein the I/O module is further configured to direct the stripe group selection module to select the data block's stripe group, wherein responsive to the stripe group selection module's selection, the service module performs the service process on the data block's stripe group, the WIP map update module sets the WIP map entry for the data block's stripe group, and the I/O module accesses the data block.

17. The system of claim 14, wherein the service registration module is further configured to deregister the service process if the service process is complete.

18. The system of claim 14, wherein the data storage device is configured as a cu RAID hard disk array.

19. The system of claim 18, wherein the service process is configured to initialize the selected stripe group.

20. The system of claim 18, wherein the service process is configured to rebuild a replacement hard disk stripe within the selected stripe group.

21. The system of claim 18, wherein the service process is configured to check the data consistency of the selected stripe group.

22. The system of claim 14, wherein the data processing device further comprises an audit log module configured to record an audit log configured as a log of the stripe group identifiers of set WIP map entries.

23. The system of claim 22, wherein the audit log module is configured to reconstruct the WIP map from the audit log.

24. The system of claim 23, wherein the data processing device further comprises a non-volatile memory configured to store the audit log.

25. The system of claim 24, further comprising fault-tolerant hard drive storage configured to store a portion of the audit log.

26. The system of claim 25, wherein the data storage device comprises the fault-tolerant hard drive storage.

27. The system of claim 25, wherein the audit log module is configured to reconstruct the WIP map from the audit log stored on the fault-tolerant hard drive storage.

28. The system of claim 25, wherein the audit log module is further configured to reconstruct the WIP map from the audit log stored on the non-volatile memory and the fault-tolerant hard drive storage.

29. A computer-readable medium tangibly embodying a program of machine-readable instructions executable by a digital processing apparatus to perform operations to service a data storage device, the operations comprising:
creating a WIP map for a service process configured to service a data storage device configured with a plurality of stripe groups, the WIP map configured with a plurality of WIP map entries corresponding to each stripe group and configured to track the completion of the service process for each stripe group;

registering the service process;

selecting a stripe group;

performing the service process at the selected stripe group; and setting the map entry in the WIP map of the selected stripe group.

30. The computer-readable medium of claim 29, wherein the instructions further comprise operations to receive an I/O command comprising a data block address of a data block of a stripe group, access the data block if no service process is active, access the data block if a service process is active and the WIP map entry for the data block's stripe group indicates the service process for the data block's stripe group is complete, and delay access to the data block until the service process is complete for the data block's stripe group if the service process is active and the WIP map entry for the data block's stripe group indicates the service process for the data block's stripe group is incomplete.

31. The computer-readable medium of claim 30, wherein the instructions further comprise operations to select the data block's stripe group, perform the service process on the data block's stripe group, and set the WIP map entry for the data block's stripe group.

32. The computer-readable medium of claim 29, wherein the instructions further comprise operations to deregister the service process if the service process is complete.

33. The computer-readable medium of claim 29, wherein the data storage device is configured as a RAID hard disk array.

34. The computer-readable medium of claim 29, wherein the instructions further comprise operations to record an audit log configured as a log of the stripe group identifiers of set WIP map entries stored in non-volatile memory.

35. The computer-readable medium of claim 34, wherein the instructions further comprise operations to store a the audit log to a fault-tolerant hard drive storage and to reconstruct the WIP map from the audit log stored on the fault-tolerant hard drive storage.

36. The computer-readable medium of claim 35, wherein the instructions further comprise operations to store a portion of the audit log in the non-volatile memory and a portion of the audit log on the fault-tolerant hard drive storage and to reconstruct the WIP map from the audit log stored in the non-volatile memory and on the fault-tolerant hard drive storage.

37. A method for servicing a data storage device, the method comprising:

creating a WIP map for a service process configured to service a data storage device configured with a plurality of stripe groups, the WIP map configured with a plurality of WIP map entries corresponding to each stripe group and configured to track the completion of the service process for each stripe group;

registering the service process;

selecting a stripe group;

performing the service process at the selected stripe group; and setting the map entry in the WIP map of the selected stripe group.

38. An apparatus for servicing a data storage device, the apparatus comprising:

means for creating a WIP map for a service process configured to service a data storage device configured with a plurality of stripe groups, the WIP map configured with a plurality of WIP map entries corresponding to each stripe group and configured to track the completion of the service process for each stripe group;

means for registering the service process;

means for selecting a stripe group;

means for performing the service process at the selected stripe group; and means for setting the map entry in the WIP map of the selected stripe group.

* * * * *